(12) United States Patent
Yang et al.

(10) Patent No.: US 11,442,798 B2
(45) Date of Patent: Sep. 13, 2022

(54) SOFTWARE RELIABILITY SIMULATION ANALYSIS METHOD BASED ON VIRTUAL REALITY AND COMPLEX NETWORK

(71) Applicant: Beihang University, Beijing (CN)

(72) Inventors: Shunkun Yang, Beijing (CN);
Minghao Yang, Beijing (CN);
Hongman Li, Beijing (CN); Xiaodong Gou, Beijing (CN)

(*) Notice: Subject to any disclaimer, the term of this patent is extended or adjusted under 35 U.S.C. 154(b) by 380 days.

(21) Appl. No.: 16/796,963

(22) Filed: Feb. 21, 2020

(65) Prior Publication Data

US 2020/0250020 A1 Aug. 6, 2020

(51) Int. Cl.
*G06F 11/00* (2006.01)
*G06F 3/01* (2006.01)
*G06F 11/36* (2006.01)
*G06T 19/20* (2011.01)

(52) U.S. Cl.
CPC .......... *G06F 11/008* (2013.01); *G06F 3/011* (2013.01); *G06F 11/366* (2013.01); *G06F 11/3664* (2013.01); *G06F 11/3692* (2013.01); *G06T 19/20* (2013.01)

(58) Field of Classification Search
CPC .. G06F 11/008; G06F 11/366; G06F 11/3664; G06F 11/3692; G06F 3/011; G06T 19/20
See application file for complete search history.

(56) References Cited

U.S. PATENT DOCUMENTS

| | | | |
|---|---|---|---|
| 8,972,564 B1* | 3/2015 | Allen | G06F 15/16 709/224 |
| 2012/0023372 A1* | 1/2012 | Lin | G06F 11/008 714/E11.155 |
| 2018/0203963 A1* | 7/2018 | Eghbal | G06F 11/261 |

* cited by examiner

*Primary Examiner* — Joshua P Lottich

(57) ABSTRACT

The present invention discloses a software reliability simulation analysis method based on virtual reality and a complex network, which realizes a two-layer network displaying the coupling of a task network and a function complex network in a virtual reality environment and is convenient for technicians to observe the operation of the network from multiple perspectives. On the basis of a technology of virtual reality, the present invention determines the task simulation based on an operation section, observes the flow of codes and the number of passing through function nodes in real time during the execution of a task, and calculates and assesses the importance degree of the nodes. The task simulation method based on the operation section is more convincing for the assessment of the importance of the nodes.

7 Claims, 4 Drawing Sheets

- S1: Obtaining network data of an object software under test, wherein the network data comprises functions and calling relationships, task sets, and task association relationships
- S2: Establishing a two-layer coupling network according to the functions and the calling relationships, the task sets and the task association relationships, wherein the two-layer coupling network comprises: a three-dimensional function network and a three-dimensional task network
- S3: Placing the two-layer coupling network in a virtual reality environment
- S4: Determining a task assignment probability P based on an operation section; and dtermining a task execution process in a sampling manner
- S5: Executing a task to determine the dynamic change of the network in the coupling network in the virtual environment
- S6: Determining and sorting the importance of function nodes according to whether the function nodes are called and the number that the function nodes are called

SOFTWARE RELIABILITY SIMULATION ANALYSIS METHOD BASED ON VIRTUAL REALITY AND COMPLEX NETWORK

TECHNICAL FIELD

The present invention relates to the technical field of software testing, and particularly relates to a software reliability simulation analysis method based on virtual reality and a complex network.

BACKGROUND

In the field of software reliability analysis based on the complex network, related technicians import the codes into the tool to span the complex network that takes the functions as the nodes and takes the function calling relationships as edges to analyze the centrality of the spanned complex network, the degrees of the nodes, aggregation coefficients, intermediaries and eigenvectors, so as to calculate and determine important nodes. Further, invulnerability analysis is conducted to analyze the reliability of the network by deleting a node or edge in the network.

However, the complex network spanned by the codes is generally a two-dimensional planar graph or a three-dimensional stereogram that can only simply change the perspective. The technicians generally need to spend more time to sort out the relationships between the nodes. This is especially true for larger complex networks. Moreover, during the invulnerability analysis, in the process of deleting a node or edge to observe the degree of damage to the network, the change of the network cannot be clearly observed. The above situation indicates that the two-dimensional graph or the simple three-dimensional network diagram limits the analysis and assessment of the technicians for the network change.

Therefore, for the software of the complex network, how to provide a method for easy analysis and display is an urgent problem for practitioners in the industry currently.

SUMMARY

In view of the problem of difficulty in full-angle clear observation for a common two-dimensional network or a three-dimensional network with simple transformation of perspective with respect to the software of a complex network, the present invention is proposed in order to provide a software reliability simulation analysis method based on virtual reality and a complex network that overcomes the above problem or at least partially solves the above problem.

Embodiments of the present invention provide a software reliability simulation analysis method based on virtual reality and a complex network, comprising:

obtaining network data of an object software under test, wherein the network data comprises functions and calling relationships, task sets, and task association relationships;

establishing a two-layer coupling network according to the functions and the calling relationships, the task sets and the task association relationships, wherein the two-layer coupling network comprises: a three-dimensional function network and a three-dimensional task network;

placing the two-layer coupling network in a virtual reality environment;

determining a task assignment probability P based on an operation section; determining a task execution process in a sampling manner;

executing a task to determine the dynamic change of the network in the coupling network in the virtual environment;

determining and sorting the importance of function nodes according to whether the function nodes are called and the number that the function nodes are called.

In one embodiment, establishing a two-layer coupling network according to the functions and the calling relationships, the task sets and the task association relationships comprises:

importing the functions and the calling relationships into a modeling tool and outputting a three-dimensional function complex network;

establishing a three-dimensional task network according to the task sets and the task association relationships;

obtaining dynamic execution data and establishing a mapping relationship between the tasks $T_i$ and the function complex network, or obtaining the mapping relationship between the tasks $T_i$ and the function complex network based on design logic;

connecting the three-dimensional task network and the three-dimensional function complex network according to the mapping relationship to establish the two-layer coupling network.

In one embodiment, importing the functions and the calling relationships into a modeling tool and outputting a three-dimensional function complex network comprises:

creating a three-dimensional stereogram of an application program of the object software under test by using a three-dimensional image visualization library, and outputting the three-dimensional coordinates of the nodes;

creating the three-dimensional function complex network according to the three-dimensional coordinates in a three-dimensional space based on a three-dimensional modeling tool for virtual reality.

In one embodiment, establishing a three-dimensional task network according to the task sets and the task association relationships comprises:

determining the association relationship of each task $T_i$, wherein the association relationships comprise: causality, juxtaposition and intersection;

determining connection relationships of the tasks $T_i$, wherein the connection relationships comprise a task transfer object and a task transfer probability;

expressing the task transfer object as directions of single and double arrows; expressing the task transfer probability as the thickness of connecting lines;

forming a task relationship network by connecting the tasks with the association relationships;

processing the relationship network by using the three-dimensional modeling tool to generate the three-dimensional task network.

In one embodiment, placing the two-layer coupling network in a virtual reality environment comprises:

expressing the relative positions of the three-dimensional function network and the three-dimensional task network by three-dimensional coordinate values;

creating a coupling network entity in the three-dimensional space according to the three-dimensional coordinate values;

placing the coupling network entity in the virtual reality environment.

In one embodiment, executing a task to determine the dynamic change of the network in the coupling network in the virtual environment comprises:

obtaining function calling information in a task execution process, wherein the function calling information comprises a node transfer process, a function calling order, function calling time and a function calling number;

expressing the function calling information corresponding to different tasks as particles emitting different colors, and obtaining the flow of the particles;

recording the total number that the particles pass through each function node and the positions of the particles in case of fault.

In one embodiment, determining and sorting the importance of function nodes according to whether the function nodes are called and the number that the function nodes are called comprises:

calculating the degree value of node P according to the function and the calling relationship, and assigning a weight value Wd to the normalized node degree value D;

calculating the number of calls of the node P according to the dynamic execution data of the task simulation, and assigning a weight value Wn to the number N of calls of the normalized node;

the importance degree of node P: I=D×Wd+N×Wn, comprehensively assessing the importance degree of node P;

sorting according to the importance degree.

The software reliability simulation analysis method based on virtual reality and a complex network provided by embodiments of the present invention combines virtual reality and reliability simulation analysis to observe a code running path in the complex network in real time during the execution of the task; and a calling relationship between the path and a function can be displayed visually, which is beneficial for related technicians to carry out effective observation and assessment.

Other features and advantages of the present invention will be illustrated in the following description, and parts will become apparent from the description, or will be known through the implementation of the present invention. The purpose and other advantages of the present invention can be realized and obtained through the structures specially pointed out in the written description, claims and drawings.

A technical solution of the present invention is further described in detail below through the drawings and embodiments.

BRIEF DESCRIPTION OF THE DRAWINGS

The drawings are used to provide further understanding for the present invention and constitute part of the description. The drawings are used to explain the present invention together with the embodiments of the present invention, and do not constitute a limitation to the present invention. In the figures.

DETAILED DESCRIPTION

Figure 1:
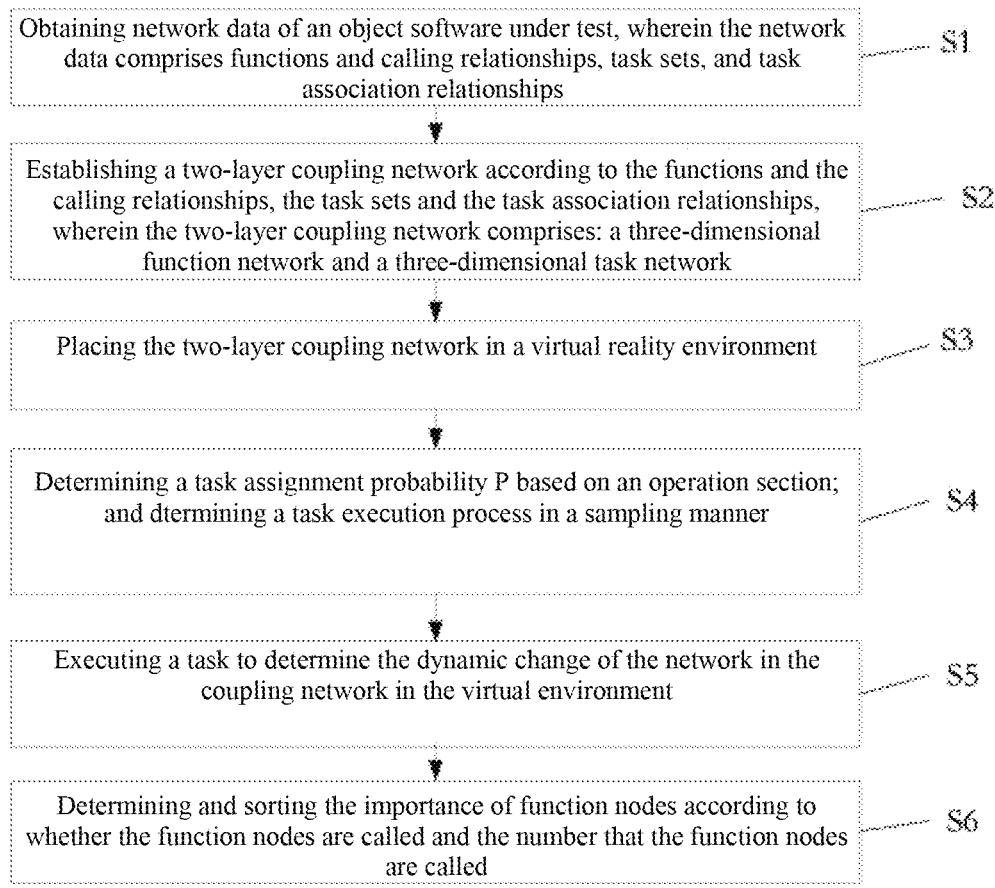
FIG. 1 is a flow chart of a software reliability simulation analysis method based on virtual reality and a complex network provided by embodiments of the present invention.

Exemplary embodiments of the disclosure are described below in more detail with reference to the drawings.

Although the exemplary embodiments of the disclosure are shown in the drawings, it should be understood that the disclosure can be realized in various forms, rather than limited by the embodiments elaborated herein.

On the contrary, the purpose of providing the embodiments is to understand the disclosure more thoroughly and to completely communicate the scope of the disclosure to those skilled in the art.

Referring to FIG. 1, embodiments of the present invention provide a software reliability simulation analysis method based on virtual reality and a complex network, comprising:

S1. obtaining network data of an object software under test, wherein the network data comprises functions and calling relationships, task sets, and task association relationships;

S2. establishing a two-layer coupling network according to the functions and the calling relationships, the task sets and the task association relationships, wherein the two-layer coupling network comprises: a three-dimensional function network and a three-dimensional task network;

S3. placing the two-layer coupling network in a virtual reality environment;

S4. determining a task assignment probability P based on an operation section; determining a task execution process in a sampling manner;

S5. executing a task to determine the dynamic change of the network in the coupling network in the virtual environment;

S6. determining and sorting the importance of function nodes according to whether the function nodes are called and the number that the function nodes are called.

In the present embodiment, a virtual reality observation method establishes the two-layer coupling network of the task network and the function complex network of the software, and places the coupling network in the virtual reality environment, for example, adopts a control device to control the angle and direction of the coupling network, and adopts an observation device for the convenience of technicians to observe and analyze from different angles.

The reliability simulation analysis method in the solution determines the task assignment probability based on a user operation section, samples the tasks through a sampling method and executes task procedures. In the simulation process, for example, a laser pointer and a control device are combined to achieve the dynamic display of the network, wherein the task execution process, for example, can be indicated by the dynamic flow of particles, so that task execution and observation of particle flow in the three-dimensional network can be performed simultaneously.

By observing the flow of the particles in the coupling network in real time in the task execution process and recording the number of passing through the function nodes, the importance degree of the nodes is assessed. In this way, the virtual reality and the reliability simulation analysis method are combined to observe the code running path in the complex network in real time during the execution of the task. The calling relationships between the functions can also be visually displayed for people through the flow of the particles in the three-dimensional network, which is more conducive to relevant technicians for identification and analysis of important nodes.

Figure 2:
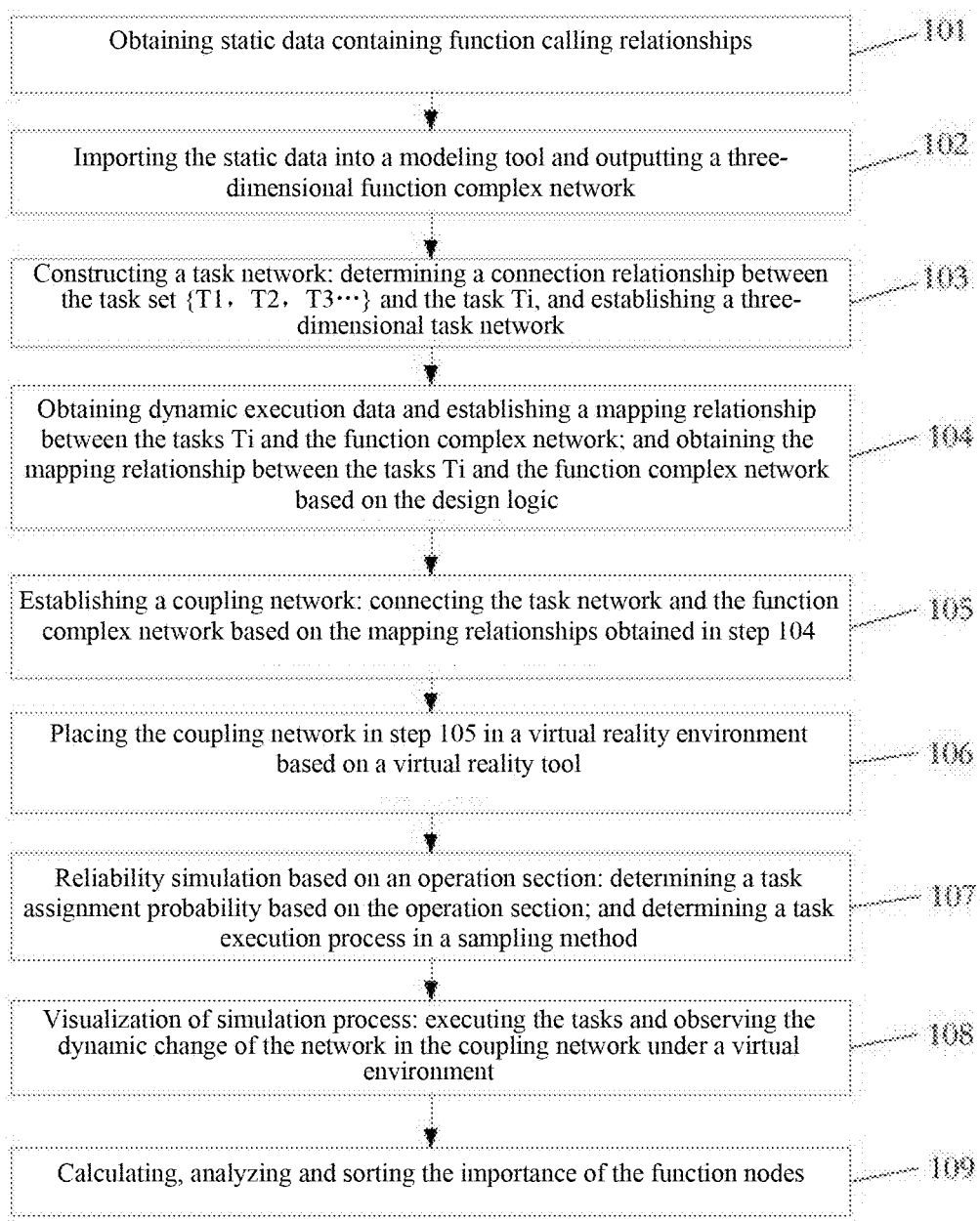
FIG. 2 is a flow chart of a complete embodiment provided by embodiments of the present invention.
Figure 3:
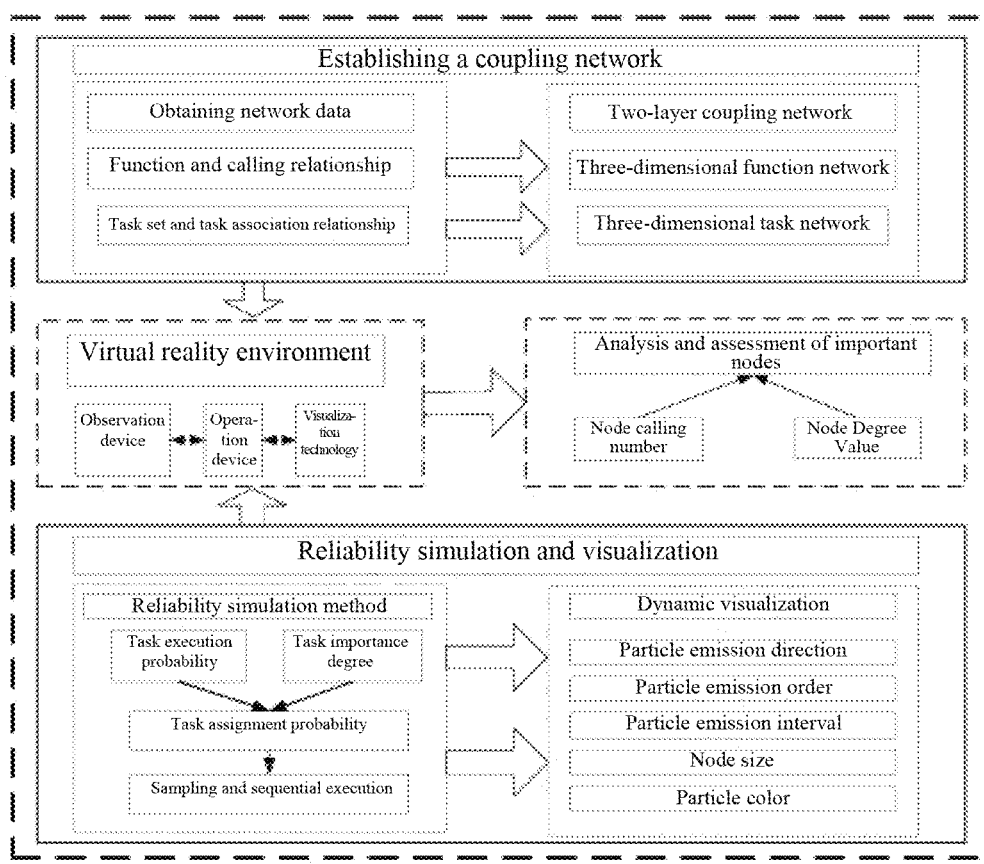
FIG. 3 is a block diagram of a software reliability simulation analysis method based on virtual reality and a complex network provided by embodiments of the present invention.
Figure 4:
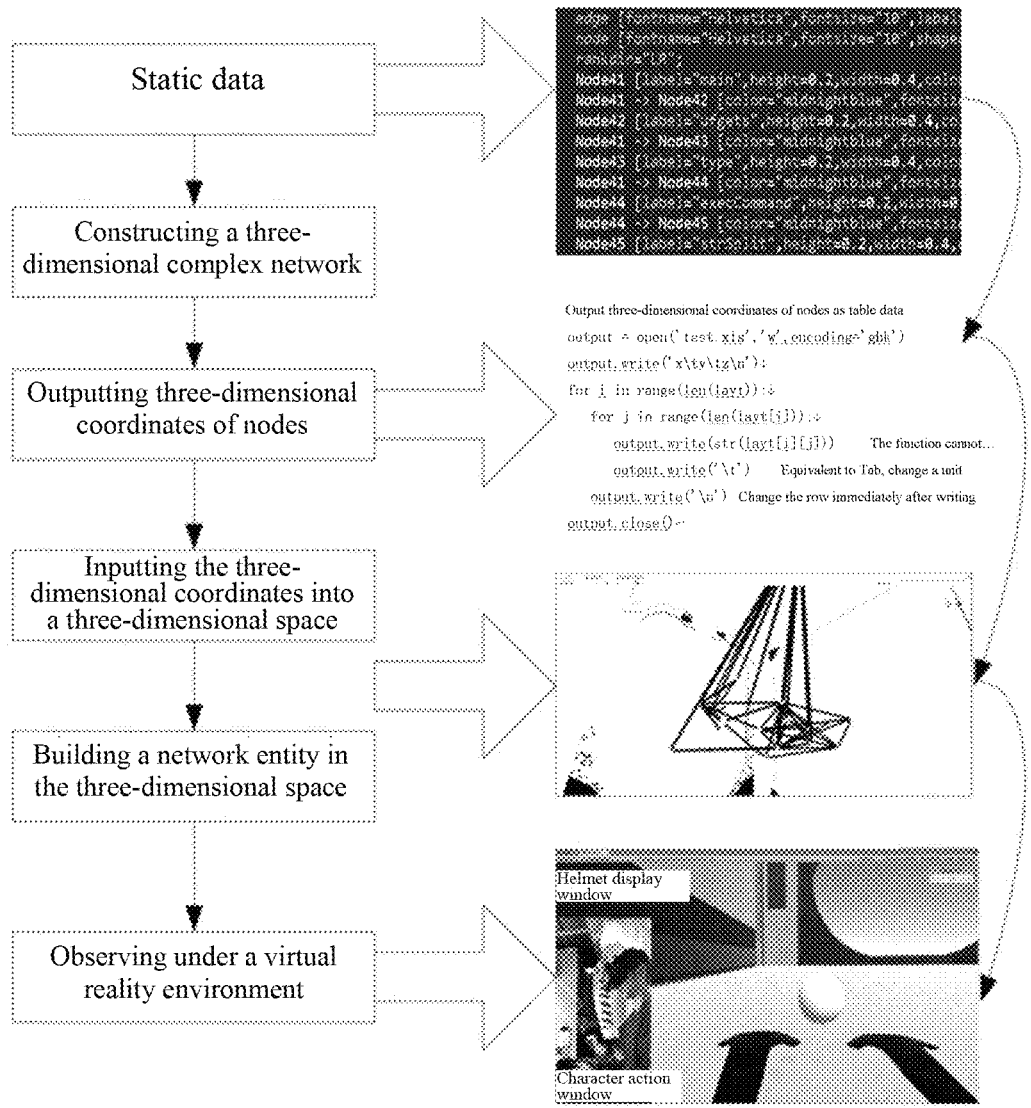
FIG. 4 is a schematic diagram of a software reliability simulation analysis method based on virtual reality and a complex network provided by embodiments of the present invention.

One complete embodiment is used below to explain the technical solution provided by the present invention:

Referring to FIG. 2, the specific implementation can refer to the following steps 101-109. FIG. 3 as the supplementation of FIG. 2 shows a block diagram of implementation steps of the solution. FIG. 4 is a schematic diagram of a software reliability simulation analysis method based on virtual reality and a complex network.

101. Obtaining static data containing function calling relationships.

Firstly, an object under test is determined, and for example, may be a source code of computer software. Static analysis software is used to obtain the static data. The static data information includes all functions and the calling relationships of the functions. For example, the static data is obtained by using a Doxygen tool. After the tool is configured and executed, the code structures and the connection relationships between the functions and the edges in the codes are extracted, and a network schematic diagram of the functions and the calling relationships is initially generated. Doxygen is a program file generation tool.

102. Importing the static data into a modeling tool and outputting a three-dimensional function complex network.

Firstly, the static data obtained in step 101 is inputted into a three-dimensional modeling tool. The three-dimensional modeling tool can be applied to three-dimensional processing of graphic images for virtual reality production and virtual reality system development.

In the present embodiment, a three-dimensional graphic visualization library is used to create a three-dimensional stereogram of the application program of the object under test, and the three-dimensional coordinates of the nodes are outputted. Then, the three-dimensional modeling tool that can be used for virtual reality is selected to create the three-dimensional function complex network graph at specified coordinates in the three-dimensional space, so as to convert the static data into the three-dimensional function complex network. The three-dimensional function complex network graph can be observed under the virtual reality environment.

For example, plotly is adopted. The plotly is a very famous and powerful open source data visualization framework. The three-dimensional network is generated according to the graphical visualization tool. Due to the poor visualization effect of the network, it is difficult to adjust the observation angle, and it is impossible to complete the observation under the virtual reality environment.

For example, unity3d is adopted. The unity3d is a multi-platform comprehensive game development tool developed by Unity Technologies that allows players to easily create interactive contents such as three-dimensional video games, architectural visualization and real-time three-dimensional animation. This three-dimensional modeling tool that can be used for virtual reality conducts three-dimensional visualization. Because the tool can only create a specified object in the specified area and achieve an expected dynamic effect, the tool does not have the functions of network construction and analysis. The execution of the tool requires human input of the coordinates of the object to be established. Therefore, two modeling tools such as the plotly and the unity3d are combined. The former is used to output the three-dimensional coordinates of the nodes to be modeled, and the latter establishes the specified object according to the three-dimensional coordinates outputted by the former, and lays the foundation for subsequent observation under the virtual reality environment. It should be noted that the method for constructing a visualization model in the present embodiment is only one of the feasible implementation steps established based on the above idea of constructing the three-dimensional visualization graph, which is not limited in the embodiment of the present invention. The protection scope of the patent of the embodiment of the present invention is not limited to this implementation process. Solutions for performing three-dimensional modeling of the function complex network by using a three-dimensional modeling tool and using the model to realize observation and analysis under the virtual reality environment beyond the scope of the present invention belong to the same solution as the present solution, and belong to the protection scope of the present invention.

103. Constructing a task network: determining a connection relationship between the task set {T1, T2, T3 . . . } and the task Ti, and establishing a three-dimensional task network.

The task set {T1, T2, T3 . . . } to be performed by the software object under test, and the causality, parallelism, intersection, and other association relationships of each task Ti are determined through the design logic; the connection relationships of the tasks Ti are determined by the design logic; and the connection relationships of the tasks Ti comprise a task transfer object and a task transfer probability. The task transfer object is expressed as directions of single and double arrows; and the task transfer probability is expressed as the thickness of connecting lines. A task network based on the design logic is formed by connecting the tasks with the association relationships.

The task relationship network is processed by using the three-dimensional modeling tool. The concrete implementation process is described in step 102. By outputting the three-dimensional coordinates of the task nodes and inputting the coordinates into the three-dimensional space, a three-dimensional task network is created at the specified coordinates, and the task network graph can be observed under the virtual reality environment.

In the present embodiment, the migration relationships between the tasks can be determined according to an expert scoring method or a software design document; the effectiveness of the association relationships of the task network can be evaluated by observing and recording the coverage rate of the complex network according to the path executing software.

104. Obtaining dynamic execution data and establishing a mapping relationship between the tasks Ti and the function complex network, or obtaining the mapping relationship between the tasks Ti and the function complex network based on the design logic.

Dynamic data analysis software is used to obtain the dynamic execution data, wherein the dynamic execution data includes the calling information of various functions during the running process after the running program executes the task Ti. The calling information includes a function number and function calling time and number.

The dynamic data analysis software is used to perform the tasks according to the task network described in step 103, thereby establishing the mapping relationship between the tasks and the node functions. Or according to the design logic, during the software development process, the type of the function called for each task execution and the function execution path are determined, thereby determining the calling relationships between the tasks and the function nodes. In order to distinguish the connection relationships of the function complex network corresponding to different tasks Ti, different colors are respectively assigned to the function nodes and paths corresponding to the tasks Ti.

In the present embodiment, the above dynamic data analysis software may use Gprof, for example. The software generates a program evaluation report after the program ends normally and exits. The report content includes the function calling relationships, the number of calls (the number of calls by a parent function and the number of calls of the child function), and the calling time (the calling time of the function itself, and calling time of the child function), for programmers to analyze the running process of the program.

105. Establishing a coupling network: connecting the task network and the function complex network based on the mapping relationships obtained in step 104.

According to the task network established in step 103 and the mapping relationships between a single task and the function network obtained in step 104, the function complex network and the task network are connected to form the coupling network.

106. Placing the coupling network in step 105 in a virtual reality environment based on a virtual reality tool.

The coupling network established in step 105 is controlled and observed through the virtual reality environment. The relative positions of the task network and the function complex network in the coupling network are represented by the values of the three-dimensional coordinates, thereby creating a coupling network entity at a specified position in the three-dimensional space. The control pressing function in the virtual reality environment is realized through the hardware button operation of the device, so as to perform graphic control.

In the present embodiment, for example, the observation perspective is adjusted through a virtual reality helmet, and the above coupling network is observed from all directions (inner and outer perspectives of the graph, upper and lower perspectives, and front and rear perspectives); the position of the graph body in the virtual reality is moved by a handle controller button; and a dynamic effect is executed by a laser pointer and the handle controller button.

107. Reliability simulation based on an operation section: determining a task assignment probability P based on the operation section; and determining a task execution process in a sampling method.

The specific practice is as follows: in the process of software development and operation, the execution of the tasks is involved. The task assignment probability P is comprehensively assessed and determined from two aspects of the execution number of the tasks and the importance of the tasks. The execution probability $Cw_i$ ($0<Cw<1$) of the task $T_i$ is determined according to the operation section; and the importance degree $S_i$ ($0<S_i<1$) of the executed task $T_i$ is determined according to the expert scoring method. Weights are respectively assigned to the task execution probability $Cw_i$ and the importance degree $S_i$, and then the assignment probability $P_i$ of each task $T_i$ is calculated and determined. According to the expert scoring method, the weight of the execution probability $Cw_i$ of the task $T_i$ is determined to be $a_i$ ($0<a_i<1$), and the weight of the importance degree $S_i$ of the task $T_i$ is determined to be ($1-a_i$). Then, the assignment probability of the task $T_i$ is: $P_i=Cw_i \times a_i+S_i \times (1-a_i)$. The sampling method refers to completing task sampling according to the task assignment probability to determine the number of sampling in a simulation test and the order of the extracted tasks.

In the present embodiment, the code numbers of the tasks are defined as A, B, C . . . ; ten tasks are extracted accordingly; the obtained task codes and order are A, A, B, B, C, A, D, B, C and A; and then the type and order of the simulation execution tasks are A→A→B→B-→C→A→D→B→C→A.

108. Visualization of simulation process: executing the tasks and observing the dynamic change of the network in the coupling network under a virtual environment.

A simulation test is conducted based on the number and task order determined in sampling of step 107. In the task execution process, function calling information is observed. The function calling information comprises a node transfer process, a function calling order, function calling time and a function calling number. The node transfer process is presented as the emission of particles from one node to another node. The function calling order is presented as the emission order of particles. The function calling time is presented as the emission time interval of the particles. The time interval is completed by scaling up and homomorphic operation. The function calling number is presented as the size of the node. The function calling information corresponding to different tasks is presented as the emission of particles of different colors.

The flow of the particles is observed, that is, the operation of the coupling network under the virtual reality environment is observed. In the observation process, the movement order of the particles during the execution of a single task shall be concerned, and the tasks corresponding to the task network when the particles stop suddenly or the particle path is wrong are recorded. Further, the movement of the particles in the coupling network when the current task is transferred to a next task for execution is observed, and the situation when the particles stop or are wrong is recorded. In the entire simulation test, the total number that the particles pass through each function node and the positions (nodes and paths) of the particles in case of fault shall be recorded.

109. Calculating, analyzing and sorting the importance of the function nodes.

The relative importance degree of the function node is determined according to the total number that each particle passes through each function node after the simulation test is completed as recorded in step 108. If the number of passing is more, it indicates that the node is more important, thereby sorting the importance degree of the function node.

In the present embodiment, the static analysis data and the dynamic execution data of task execution are combined to comprehensively assess the importance degree I of the node. According to the static analysis data, the degree value of node P is calculated, and a weight value Wd is assigned to the degree value D of the normalized node. The calling number for the node P is calculated according to the dynamic execution data of the task simulation, and a weight value Wn is assigned to the calling number N of the normalized node. Then, the importance degree of the node P is: $I=D \times Wd+N \times Wn$, so as to comprehensively assess the importance degree of the node.

Through the above steps, the virtual reality technology is combined with the complex network, so as to observe and analyze the change of the network from a more comprehensive and clear perspective.

The technical solution provided by the present invention can solve the problem of difficulty in full-angle clear observation for a common two-dimensional network or a three-dimensional network with simple transformation of perspective, realizes a two-layer network displaying the coupling of the task network and the function complex network in the virtual reality environment, and is convenient for technicians to observe the operation of the network from multiple perspectives. On the basis of a technology of virtual reality, the present invention determines the task simulation based on an operation section, observes the flow of codes and the number of passing through function nodes in real time during the execution of a task, and calculates and assesses the importance degree of the nodes. The task simulation method based on the operation section is more convincing for the assessment of the importance of the nodes.

Compared with the method for assessing the importance of the node by simply analyzing the degree value and aggregation coefficient of the node through the static data, the technical solution provided by the present invention has a more authentic and reliable assessment effect. Moreover, the virtual reality and the reliability simulation analysis method are combined to observe the code running path in the complex network in real time during the execution of the task. The path can also be visually displayed for people through the flow of the particles in the three-dimensional network, which is more conducive to relevant technicians for effective observation and assessment.

Obviously, those skilled in the art could implement various modifications to and variations of the present invention without departing from the spirit and scope of the present invention. So, the present invention is intended to include the modifications and variations if the amendments and variations of the present invention belong to claims of the present invention and the equivalent technical scope.

The invention claimed is:

1. A software reliability simulation analysis method based on virtual reality and a complex network, comprising:
   obtaining network data of an object software under test, wherein the network data comprises functions and calling relationships, task sets, and task association relationships;
   establishing a two-layer coupling network according to the functions and the calling relationships, the task sets and the task association relationships, wherein the two-layer coupling network comprises: a three-dimensional function network and a three-dimensional task network;
   placing the two-layer coupling network in a virtual reality environment;
   determining a task assignment probability P based on an operation section; determining a task execution process in a sampling manner;
   executing a task to determine the dynamic change of the network in the coupling network in the virtual environment;
   determining and sorting the importance of function nodes according to whether the function nodes are called and the number that the function nodes are called.

2. The method of claim 1, wherein establishing a two-layer coupling network according to the functions and the calling relationships, the task sets and the task association relationships comprises:
   importing the functions and the calling relationships into a modeling tool and outputting a three-dimensional function complex network;
   establishing a three-dimensional task network according to the task sets and the task association relationships;
   obtaining dynamic execution data and establishing a mapping relationship between the tasks Ti and the function complex network; or obtaining the mapping relationship between the tasks Ti and the function complex network based on design logic;
   connecting the three-dimensional task network and the three-dimensional function complex network according to the mapping relationship to establish the two-layer coupling network.

3. The method of claim 2, wherein importing the functions and the calling relationships into a modeling tool and outputting a three-dimensional function complex network comprises:
   creating a three-dimensional stereogram of an application program of the object software under test by using a three-dimensional image visualization library, and outputting the three-dimensional coordinates of the nodes;
   creating the three-dimensional function complex network according to the three-dimensional coordinates in a three-dimensional space based on a three-dimensional modeling tool for virtual reality.

4. The method of claim 2, wherein establishing a three-dimensional task network according to the task sets and the task association relationships comprises:
   determining the association relationship of each task Ti, wherein the association relationships comprise: causality, juxtaposition and intersection;
   determining connection relationships of the tasks Ti, wherein the connection relationships comprise a task transfer object and a task transfer probability;
   expressing the task transfer object as directions of single and double arrows; expressing the task transfer probability as the thickness of connecting lines;
   forming a task relationship network by connecting the tasks with the association relationships;
   processing the relationship network by using the three-dimensional modeling tool to generate the three-dimensional task network.

5. The method of claim 1, wherein placing the two-layer coupling network in a virtual reality environment comprises:
   expressing the relative positions of the three-dimensional function network and the three-dimensional task network by three-dimensional coordinate values;
   creating a coupling network entity in the three-dimensional space according to the three-dimensional coordinate values;
   placing the coupling network entity in the virtual reality environment.

6. The method of claim 1, wherein executing a task to determine the dynamic change of the network in the coupling network in the virtual environment comprises:
   obtaining function calling information in a task execution process, wherein the function calling information comprises a node transfer process, a function calling order, function calling time and a function calling number,
   expressing the function calling information corresponding to different tasks as particles emitting different colors, and obtaining the flow of the particles;
   recording the total number that the particles pass through each function node and the positions of the particles in case of fault.

7. The method of claim 1, wherein determining and sorting the importance of function nodes according to whether the function nodes are called and the number that the function nodes are called comprises:
   calculating the degree value of node P according to the function and the calling relationship, and assigning a weight value Wd to the normalized node degree value D;
   calculating the number of calls of the node P according to the dynamic execution data of the task simulation, and assigning a weight value Wn to the number N of calls of the normalized node;
   the importance degree of node P: $I=D \times Wd+N \times Wn$, comprehensively assessing the importance degree of node P;
   sorting according to the importance degree.

* * * * *